United States Patent [19]

Meynier

[11] Patent Number: 4,645,038
[45] Date of Patent: Feb. 24, 1987

[54] DISC BRAKE

[75] Inventor: Guy Meynier, Aulnay-sous-Bois, France

[73] Assignee: Bendix France, Paris, France

[21] Appl. No.: 800,003

[22] Filed: Nov. 20, 1985

[51] Int. Cl.$^4$ .............................................. F16D 65/56
[52] U.S. Cl. ............................... 188/71.9; 188/71.7; 188/196 M; 188/196 BA
[58] Field of Search .................. 188/73.33, 73.32, 71.9, 188/71.7, 196 M, 196 D, 196 BA, 234, 250 G

[56] References Cited

U.S. PATENT DOCUMENTS

| | | | |
|---|---|---|---|
| 3,211,263 | 10/1965 | Harrison | 188/71.9 X |
| 3,392,806 | 2/1968 | Knapp | 188/196 BA X |
| 3,547,229 | 12/1970 | Pollinger et al. | 188/71.9 X |
| 3,621,944 | 11/1971 | Langley | 188/71.9 |
| 3,820,635 | 6/1974 | Hurt | 188/71.9 |
| 3,942,612 | 3/1976 | LeMarchand et al. | 188/73.33 |
| 4,228,875 | 10/1980 | Haraikawa et al. | 188/72.7 |
| 4,567,966 | 2/1986 | Bayliss | 188/71.9 |

FOREIGN PATENT DOCUMENTS

| | | | |
|---|---|---|---|
| 2300937 | 8/1976 | France . | |
| 2504224 | 10/1982 | France | 188/71.9 |

Primary Examiner—George E. A. Halvosa
Attorney, Agent, or Firm—Larry J. Palguta; Ken C. Decker

[57] ABSTRACT

The invention concerns a disc brake with a caliper (10) sliding on a fixed support (12) incorporating a first friction component (14) which is capable of being applied against a surface of a brake disc by way of a brake actuator through a plunger (28). A second friction component is capable of being applied against the other surface of the disc through the sliding caliper. Rotation of the plunger (28) is capable of causing the latter to move axially relative to the brake actuator. The disc brake incorporates an adjusting and retaining component (44) having a fork (40) at one of its ends (42) which is intended to cooperate with complementary surfaces (38) formed on the plunger (28) and having a hole (48) at its other end (46) by way of which the component (44) is immobilized, through a screw (50), relative to the first friction component (14). The adjusting and retaining component (44) enables the rotation of the plunger (28) to be immobilized when the screw (50) is tightened and, when the latter is unscrewed, the component (44) is used as a spanner to tighten or slacken the plunger (28).

3 Claims, 4 Drawing Figures

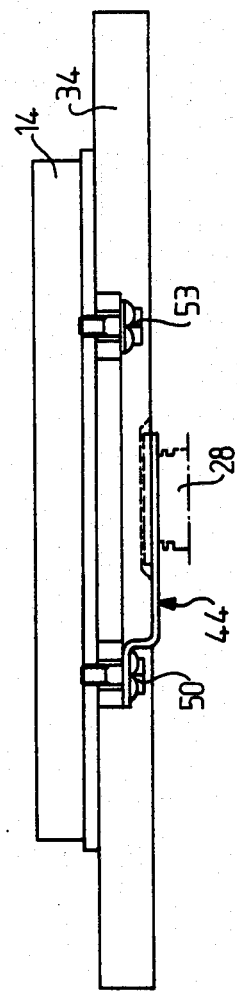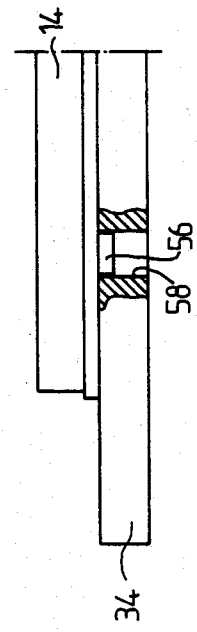

DISC BRAKE

The invention concerns a disc brake intended particularly to equip a motor vehicle.

The invention concerns in particular a disc brake with a caliper sliding on a fixed support incorporating a first friction component which is capable of being applied against a surface of a brake disc by means of a brake actuator through a plunger, and a second friction component capable of being applied against the other surface of the disc through the sliding caliper.

A disc brake of this type is known, certain examples of which incorporate a device allowing axial movement of the plunger relative to the brake actuator, in particular when this plunger is subjected to rotation about itself. A brake of this type is described in French Pat. No. 1,317,919, in which the plunger is formed by the piston of the brake actuator and the rotation of which enables this piston to advance or to retract. The patent also shows an automatic adjustment device which operates correctly when the piston is prevented from turning, this taking place during normal operation of the brake. It will be noted that retraction of the piston may be obtained either by turning the screw after removing the lever, which requires additional operations, or the piston may be adjusted after withdrawing the friction components. Both of these operations have disadvantages which are difficult or impossible to overcome; as an example, the case will be mentioned of the rear of the brake actuator which is inaccessible, for example, when mechanical control is provided by a wedge, and the impossibility of removing the friction components when the brake disc is worn and has a ridge on its outer periphery which resists the removal of the friction components.

The invention proposes a disc brake of simple construction which does not incorporate the disadvantages mentioned above.

With this aim, the invention proposes a disc brake with a caliper sliding on a fixed support incorporating a first friction component which is capable of being applied against a surface of a brake disc by means of a brake actuator through a plunger, and a second friction component which is capable of being applied against the other surface of the disc through the sliding caliper, rotation of the plunger being capable of causing the latter to move axially relative to the brake actuator, characterized in that the brake incorporates an adjusting and retaining component having a fork at one of its ends which is intended to co-operate with complementary surfaces formed on the plunger and having a hole at its other end by means of which the said component is immobilized, through a removable means, relative to the first friction component.

It is apparent that owing to these characteristics, during normal operation of the brake, the adjusting and retaining component prevents rotation of the plunger, and, after removal of the removable means, the adjusting and retaining component allows rotation of the plunger owing to co-operation between the fork and the complementary surfaces of the plunger.

This device also allows manual pre-adjustment of the brake and prevents excessive travel of the brake actuator after replacement of the friction components, for example.

An embodiment of the invention is described below by way of an example which is not limiting, with reference to the accompanying drawings in which:

FIG. 3 is a partial view in the direction of the arrow A shown in FIG. 2; and

FIG. 4 is a partial view sectioned along the line 4—4 shown in FIG. 2.

Figure 1:
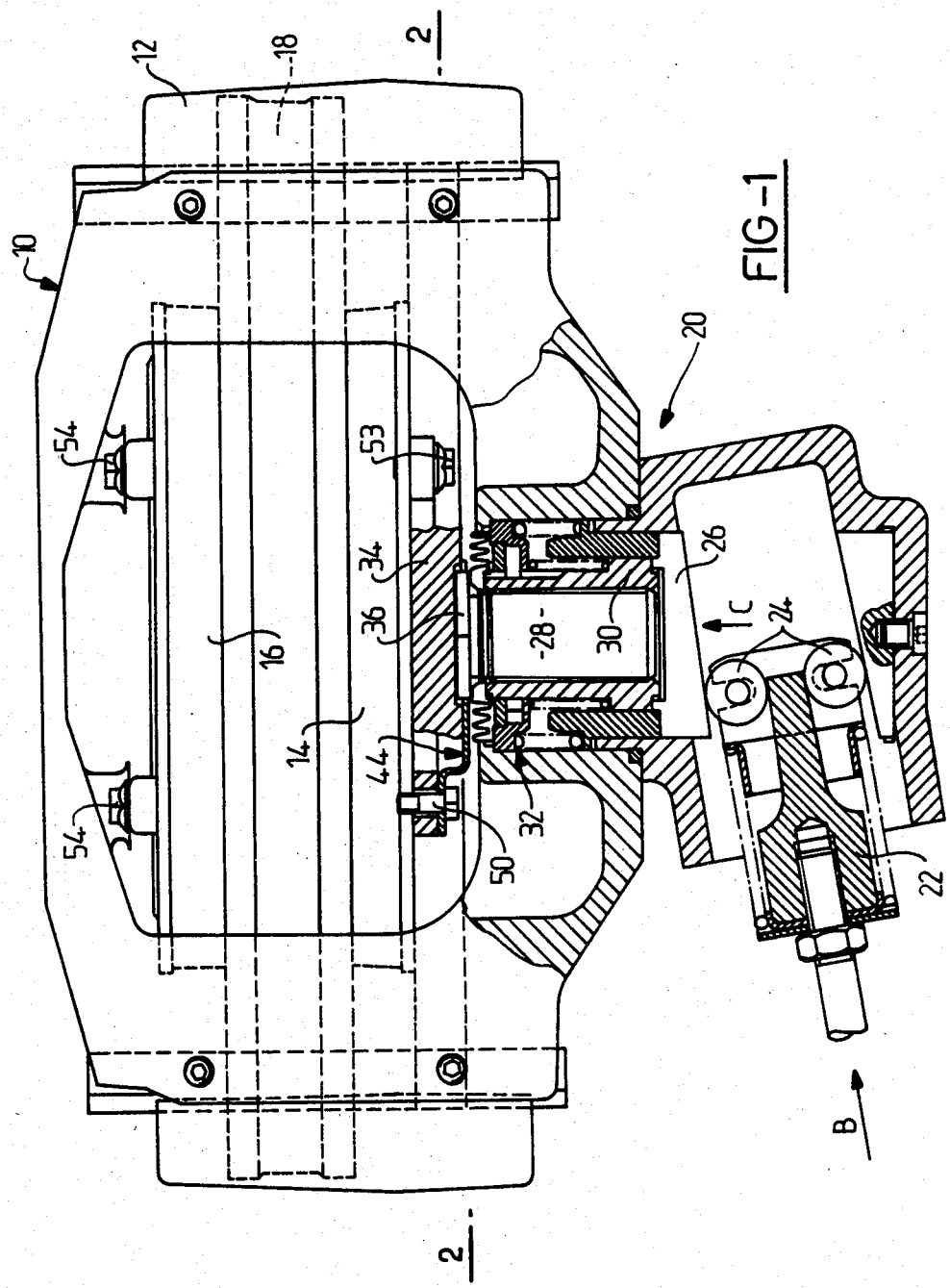
FIG. 1 is a partially sectioned plan view of a disc brake constructed in accordance with the invention.
Figure 2:
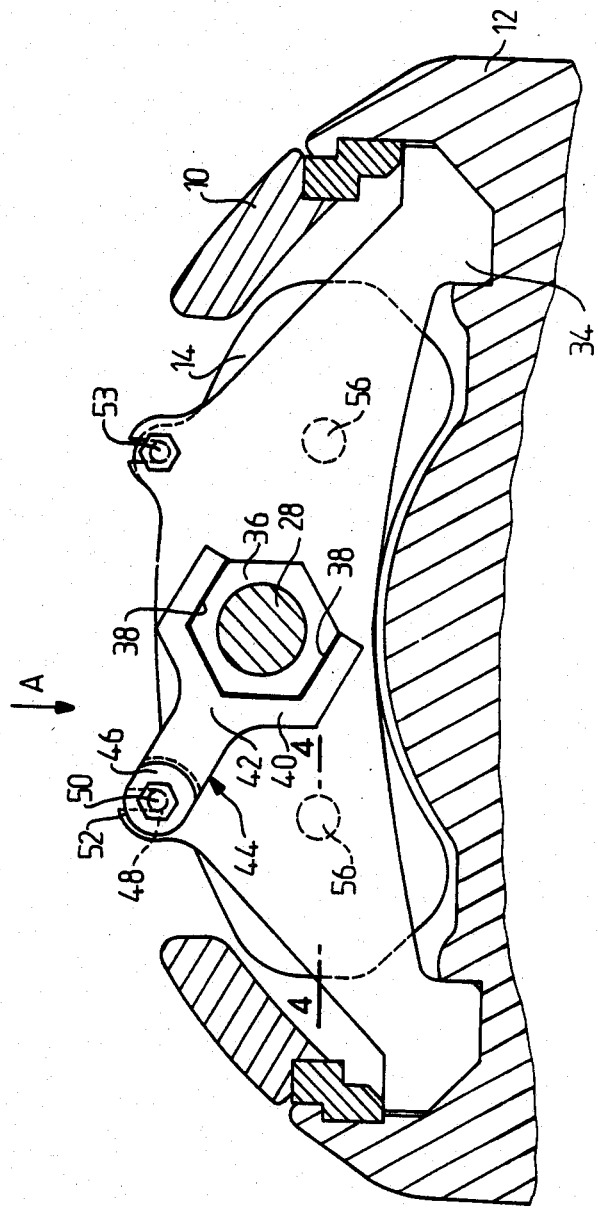
FIG. 2 is a view in cross-section along the line of the brake shown in FIG. 1.

The disc brake shown in FIGS. 1 and 2 incorporates a caliper, indicated as a whole by reference number 10, which slides on a fixed support 12 joined to a fixed portion of the vehicle (not shown). The disc brake incorporates two friction components 14 and 16 positioned on each side of a brake disc 18. The caliper 10 incorporates a brake actuator indicated as a whole by the reference number 20, this brake actuator is of the type which is controlled by a wedge, that being to say it incorporates a wedge 22 which is capable of being moved in the direction of the arrow B under the effect of a jack, for example, this movement in the direction of the arrow B pushing, through rollers 24, a sliding component 26 in the direction of the arrow C. This sliding component 26 is capable of moving a threaded plunger 28 through a nut 30 in the direction of the arrow C. The brake actuator 20 is also equipped with an automatic adjustment device indicated as a whole by the reference number 32 this automatic adjustment may be of the type described in French Pat. No. 1,317,919 and will not be described further. The plunger 28 is capable of applying pressure to a first friction component 14, through a reinforcing pad 34, by means of a portion 36 positioned on the same side as the friction component 14 and having the shape of a hexagonal head. This hexagonal head has three pairs of opposite sides 38, forming complementary surfaces, with which a fork 40 co-operates, formed at one end 42 of an adjusting and retaining component indicated as a whole by the reference number 44. This retaining component 44 incorporates a hole 48 at its other end 46, through which a screw 50 passes which is screwed into the friction component 14 and which passes through an oblong opening 52 formed in the pad 34. The diameter of the hole 48 is slightly less than the diameter of the threaded portion of the screw 50. It will also be noted that the oblong opening 52 opens out on the external peripheral edge of the pad 34. The screw 50 forms a removable means. Referring to FIGS. 1, 2 and 3, it is seen that the friction component 14 is fixed to the pad 34 by means of a second screw 53, and in the same way the second friction component 16 is fixed to the caliper 10 by means of two screws 54. Referring to FIGS. 2 and 4, it is seen that in addition to the screws 50, 53 and 54, the friction components 14 and 16 incorporate pegs 56 which enter into openings 58 formed either on the pad 34 for the friction component 14, or on the caliper 10 for the friction component 16. These pegs 56, by co-operating with the openings 58, allow the braking forces to be transferred to the pad 34 and to the caliper 10, respectively.

The brake described above with the aid of FIGS. 1 to 4 operates in the following manner:

When a force is applied to the wedge 22 in the direction of the arrow B, the wedge 22 moves also in the direction of the arrow B and exerts a force in the direction of the arrow C, through rollers 24, onto the sliding component 26. This component also moves the nut 30 and the plunger 28 in the direction of the arrow C, through the threaded connection between the two latter components. The plunger 28 by means of its portion 36, also moves the pad 34 and the friction component 14 which is joined to it, in the direction of the arrow C. This movement applies the friction component 14 against the disc 18 and, by reaction through the sliding caliper 10, applies the friction component 16 against the other surface of the disc 18. When braking is released, the different components return to their positions shown in FIG. 1.

When it is required to change the friction components 14 and 16, the following operation is carried out: first of all the screw 50 is unscrewed and, with the aid of the adjusting and retaining component 44 used as a flat spanner, the plunger 28 is screwed inside its nut 30, making use of the portion 36 forming a hexagonal head. This movement of the plunger 28 in a direction opposite to that of the arrow C allows the pegs 56 to be disengaged from the openings 58 formed in the pad 34, after removal of the screw 53. The friction component 14 can then be removed from the brake through the opening formed in the caliper 10 by inclining this friction component 14 slightly so as to allow it to be passed through. By moving the caliper in the direction of the arrow C and by removing the two screws 54, the friction component 16 can be removed in the same way. After replacement of the friction component 16, the screws 54 are retightened, then the caliper is moved in the direction opposite to that of the arrow C and the friction component 14 is placed in position, and the screw 53 holding this friction component 14 on the pad 34 is tightened. With the aid of the adjusting and retaining component 44, the plunger 28 is unscrewed in such a way as to bring it into contact with the pad 34, which allows the clearances to be recovered, the screw 50 is then fixed in the friction component 14, which has the effect, on the other hand, of holding the friction component 14 against the pad 34 in the same way as the screw 53 did, and on the other hand, of immobilizing the plunger 28 by means of the fork 40 formed on the component 44 and thus preventing any uncontrolled rotation of this plunger. This immobilization is even more important in the case where the brake actuator incorporates an automatic adjustment 32 where operation of this adjustment depends essentially on non-rotation of the plunger 28.

It will be noted that, owing to the invention, immobilization of the plunger 36 is very simple and allows manual intervention, when this is necessary, with a suitable tool which is permanently available on the brake. It will also be noted that, as the screw 50 is captive in the adjusting and retaining component 44, any risk of forgetting to mount the screw 50 is eliminated.

I claim:

1. A disc brake with a caliper sliding on a fixed support and incorporating a first friction component capable of being applied against one surface of a brake disc by means of a brake actuator through a plunger, and a second friction component capable of being applied against the other surface of the disc through the sliding caliper, rotation of the plunger moving the plunger axially relative to the brake actuator, characterized in that the brake includes an adjusting and retaining component having a fork at one end which cooperates with complementary surfaces formed on the plunger and having a hole at the other end by means of which the adjusting and retaining component is immobilized, through removable means, relative to the first friction component, the removable means comprising a screw which passes through the hole and is screwed into the first friction component to hold the first friction component against a reinforcing pad, the pad having an oblong opening which communicates with an external peripheral pad edge and allows the screw to pass through radially, relative to the disc, when the screw is disengaged from the first friction component, disengagement of the screw from the first friction component permitting the adjusting and retaining component to be rotated in order to rotate and displace axially the plunger.

2. The disc brake according to claim 1, characterized in that the plunger has a portion positioned on a side adjacent the first friction component and which has the shape of a hexagonal head, the fork cooperating with two opposite sides of the head.

3. The disc brake according to claim 1, characterized in that the screw and the adjusting and retaining component form a subassembly removable as a unit.

* * * * *